United States Patent [19]

Besik

[11] 4,008,159
[45] Feb. 15, 1977

[54] RENOVATION OF WASTE WATER

[75] Inventor: Ferdinand Besik, Mississauga, Canada

[73] Assignee: Ontario Research Foundation, Sheridan Park, Canada

[22] Filed: Jan. 21, 1975

[21] Appl. No.: 542,716

[52] U.S. Cl. .................. 210/7; 210/14; 210/17; 210/18; 210/20; 210/40; 210/63 Z; 210/151; 210/195 S; 210/201; 210/202; 210/206

[51] Int. Cl.[2] .......................... C02C 1/04

[58] Field of Search ............... 210/3–8, 210/14–18, 20, 63, 39, 40, 150, 151, 195–197, 198 R, 199–202, 205–207, DIG. 28

[56] References Cited

UNITED STATES PATENTS

| | | | |
|---|---|---|---|
| 2,359,004 | 9/1944 | Schlenz et al. | 210/16 |
| 3,563,888 | 2/1971 | Klock | 210/14 |
| 3,673,083 | 6/1972 | Sawyer et al. | 210/DIG. 28 |
| 3,728,253 | 4/1973 | Kaufman | 210/DIG. 28 |
| 3,803,029 | 4/1974 | Blecharczyk | 210/17 |
| 3,835,039 | 9/1974 | Ciambrone | 210/17 |
| 3,853,752 | 12/1974 | Tymoszczuk | 210/150 |
| 3,878,097 | 4/1975 | Mochizuki et al. | 210/151 |
| 3,897,000 | 7/1975 | Manot | 210/14 |
| 3,904,518 | 9/1975 | Hutton et al. | 210/18 |
| 3,907,673 | 9/1975 | Belk et al. | 210/17 |

OTHER PUBLICATIONS

Culp et al.; "Advanced Wastewater Treatment"; Van Nostrand Co., N. Y. (1971) pp. 271–273.

*Primary Examiner*—Frank A. Spear, Jr.
*Assistant Examiner*—Benoit Castel
*Attorney, Agent, or Firm*—Sim & McBurney

[57] ABSTRACT

A waste water treatment system for the renovation of waste water includes a four stage treatment for removal of gross solids, suspended, colloidal and dissolved organic matter, dissolved nitrogenous material, phosphates odor, color, coliform and residual solids.

11 Claims, 5 Drawing Figures

RENOVATION OF WASTE WATER

FIELD OF INVENTION

This invention relates to the renovation of waste water, typically domestic waste water, for reuse by a multistage system.

BACKGROUND TO THE INVENTION

Waste water renovation systems have been proposed in the past utilizing a plurality of treatment steps to remove the contaminants. These prior art systems generally have been cumbersome and time-consuming and have required considerable maintenance.

SUMMARY OF INVENTION

In accordance with the present invention, there is provided a multistage system for the renovation of waste water which is effective, virtually maintenance free and is much faster than prior art systems. The invention involves a three and preferably a four-stage operation, including removal of gross solids in a first stage, removal of organic and nitrogenous materials by adsorption and biological oxidation in a second stage, phosphate removal and chemical oxidation in a third stage, and, if required, removal of residual solids in a fourth stage.

DESCRIPTION OF PREFERRED EMBODIMENTS

Figure 1:
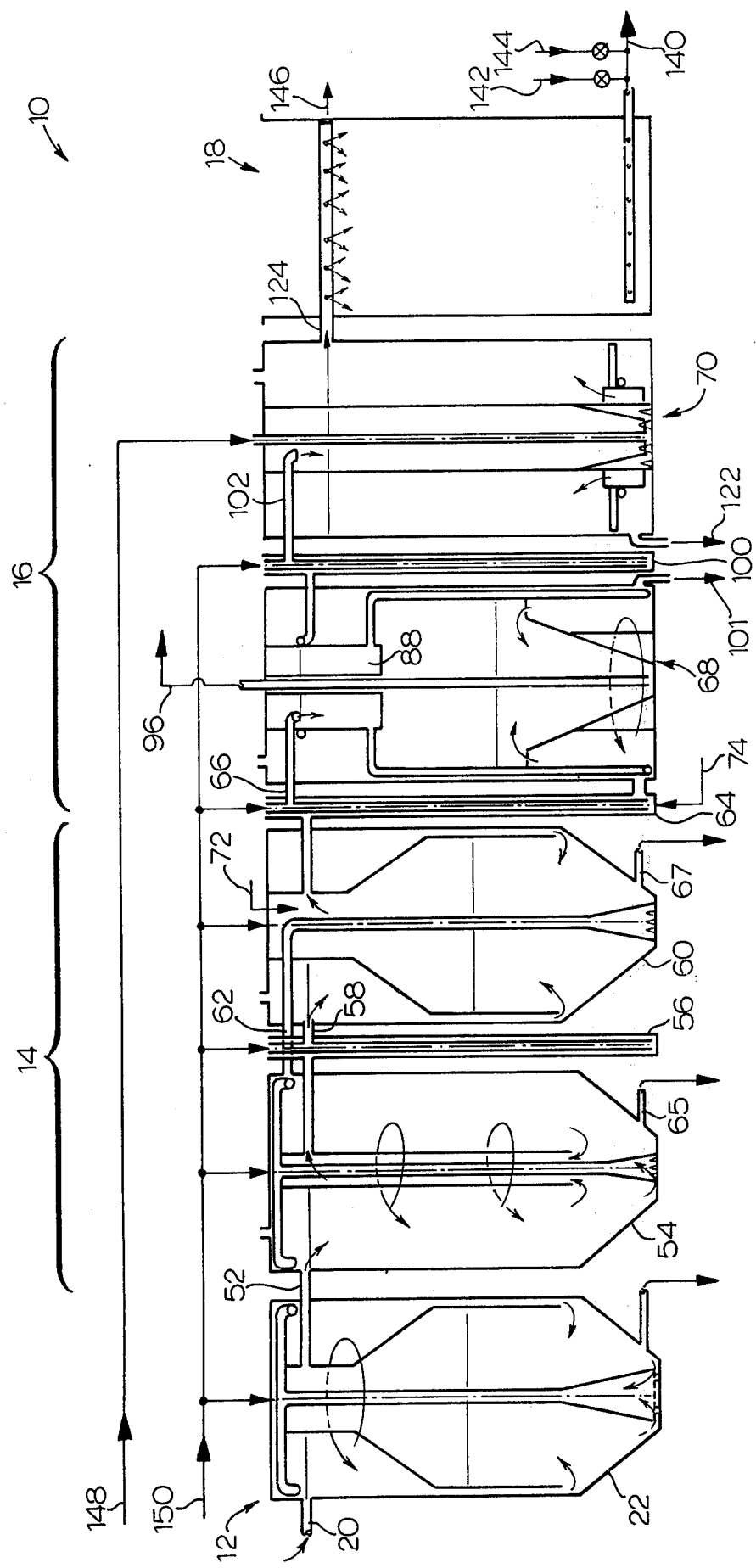
FIG. 1 is a schematic representation of a waste water treatment system in accordance with this invention.

A four-stage sewage treatment system 10 includes a primary treatment 12, an adsorption-biooxidation treatment 14, a chemical treatment 16 and a fixed bed adsorption-biooxidation treatment 18.

Figure 2:
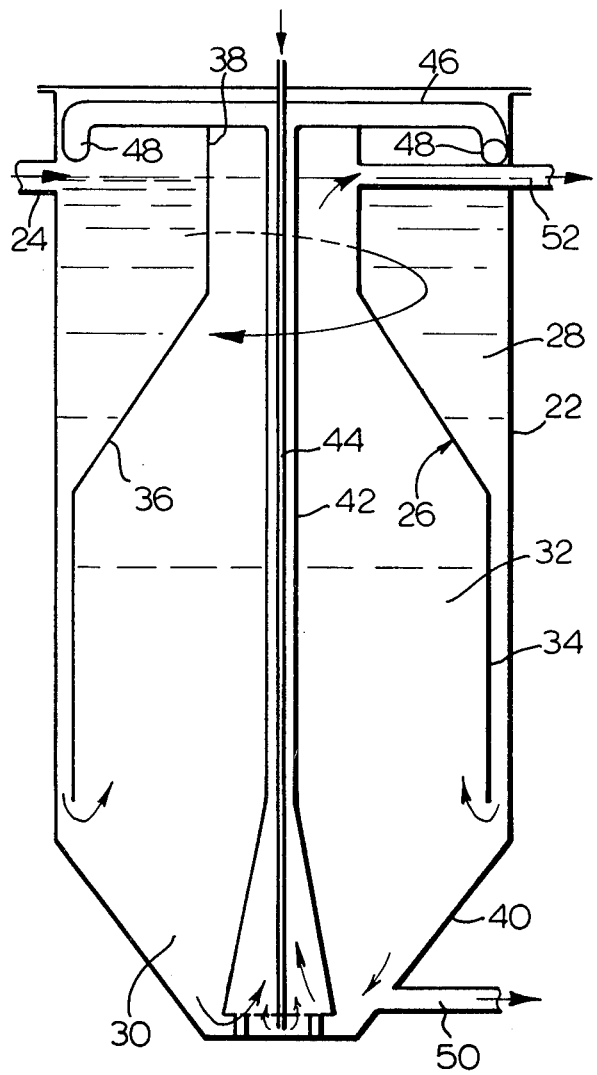
FIG. 2 is a sectional schematic representation of a primary treatment unit for use in the system of FIG. 1.

Raw comminuted sewage is fed by line 20 to the primary treatment 12. As may be seen in more detail in FIG. 2, the primary treatment 12 occurs in a circularly cross-sectioned reactor 22. An inverted funnel-like member 26 is located within the container 22 and defines therewith a first chamber 28 between the funnel-like member 26 and the container 22, a sludge settling chamber 30 and a sludge separation chamber 32 inside the funnel-like member 26.

The funnel-like member 26 includes a skirt portion 34 concentric with and spaced inwardly from the inner wall of the container 22, a truncated cone portion 36 and a throat portion 38 also concentric with the container 22 and extending upwardly above the intended liquid level in the container 22.

The sludge settling chamber 30 also is defined by a truncated conical wall 40 of the container 22 whereby the sludge settling chamber 30 has a decreasing diameter towards the base of the container 22.

A hollow riser tube 42 is positioned axially of the container 22 and extends through the sludge separation chamber 32 into the sludge settling chamber 30 to a location spaced immediately upwardly of the base of the container 22, the riser tube 42 flaring outwardly towards the lower end thereof.

A gas feed tube 44 is situated within the riser tube 42 to feed air, oxygen or other gas into the riser tube 42 adjacent the lower end of the riser tube 42 to draw sludge out of the settling chamber 30 into and up the riser tube 42 under the influence of the gas rising in the tube 42.

The riser tube 42 adjacent its upper extremity but within the reactor 22 communicates with cross-arm members 46 extending radially of the container 22 which in turn communicate with tubular discharge members 48 which include a downwardly-extending portion and a horizontally-extending portion.

The sewage is fed to the container 22 through pipe 24 and is mixed with recycling mixed liquor suspended solids fed from the discharge members 48. The tangential discharge of the recycling MLSS causes rotation of the reacting liquor in the first chamber 28 about the axis of the container 22.

The rotation of the material in the chamber 28 applies centrifugal forces to the suspended solids, causing the solids having a specific gravity greater than the liquid medium to concentrate adjacent the inner wall of the container 22 while the solids having a specific gravity less than the liquid tend to move towards the axis of the reactor 22.

Gravitational forces acting on the heavy solids causes them to settle towards the sludge settling chamber 40. Anaerobic decomposition of the settled solids in the chamber 40 occurs, decreasing their volume and mass. The rotation of the solids in the chamber 28 provides the mixing required to speed up the anaerobic reactions.

The lighter suspended solids move upward with the waste water through the sludge separation chamber 32, wherein further gravitational separation of suspended solids occurs.

The microorganisms in the liquid consist of facultative and anaerobic bacteria responsible for hydrolysis and fermentation of complex organic compounds to simple organic acids. The microorganisms tend to be retained and are recycled with the recirculating sludge in riser tube 42 and hence assist in hydrolyzing and decomposing the suspended solids.

In this way, suspended solids present in the sewage feed line 24 and separated in the chambers 28, 30 and 32 are continuously hydrolyzed and fermented, thereby continuously decreasing their volume and mass. Thus, withdrawal of solids from the reactor 22 rarely is required, such withdrawal being made typically by pipe 50. The reactor 22 also tends to decrease the concentration of soluble organic matter and to equalize wide variations in soluble organic matter concentration in the feed sewage.

The processed waste water is removed from the upper portion of the chamber 32 through a pipe 52 for passage to the adsorption-biooxidation treatment 14.

The adsorption-biooxidation treatment consists of contact with activated carbon and a mixed microbial population in a reactor 54. This contact serves to remove organic matter, organic nitrogen, ammonia and nitrite and nitrate nitrogen from the processed waste water.

The waste water, if required, may be flash aerated from the reactor 54 by external flash aerator 56 and passed by line 58 to a clarifier 60. In the clarifier 60, the biological reactions are extended, functioning thereby, in effect, as a second stage reactor. The suspended solids are separated from the liquid phase in the clarifier 60 by settling. The settled sludge mainly is withdrawn from the clarifier 60 by a flash aerator for recycle, after saturation with oxygen, to the reactor 54 by line 62. The clarified effluent is removed from the clarifier 60 by external riser 64 for discharge from the adsorption-biooxidation treatment 14 by line 66 to the chemical treatment 16. Excess sludge may be withdrawn from the adsorption-biooxidation treatment 14 by pipes 65 and 67 respectively associated with the reactor 54 and clarifier 60.

The adsorption-biooxidation treatment 14 is described in more detail and forms the subject of copending U.S. patent application Ser. No. 540,513 filed Jan. 13, 1975, and now U.S. Pat. No. 3,980,556.

Reference may be had to the latter application for additional process and constructional details of the reactor 54 and the clarifier 60.

The processed waste water in line 66 is passed to the chemical treatment 16, which consists of a phosphate removal unit 68 and an ozonation unit 70. Prior to feed of the processed waste water to the phosphate removal unit 68, a chemical coagulant, typically alum, is added to the processed waste water by line 72. If desired, additional chemicals such as hypochlorite may be added, as may an anionic polymer by line 74.

Figure 3:
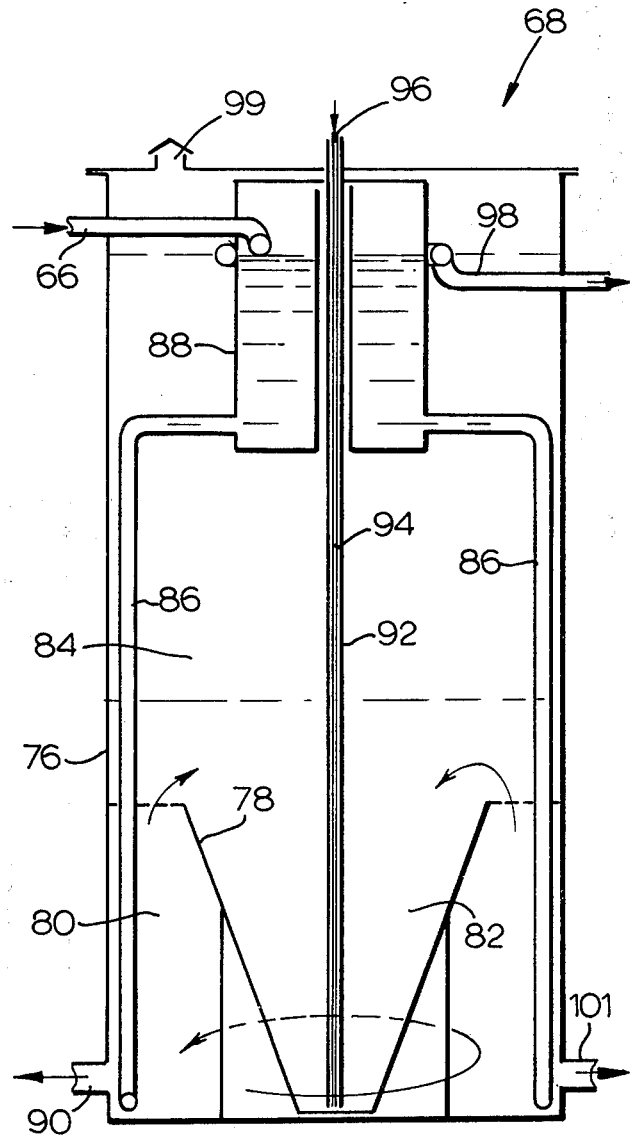
FIG. 3 is a sectional schematic representation of a phosphate removal unit for use in the system of FIG. 1.
Figure 4:
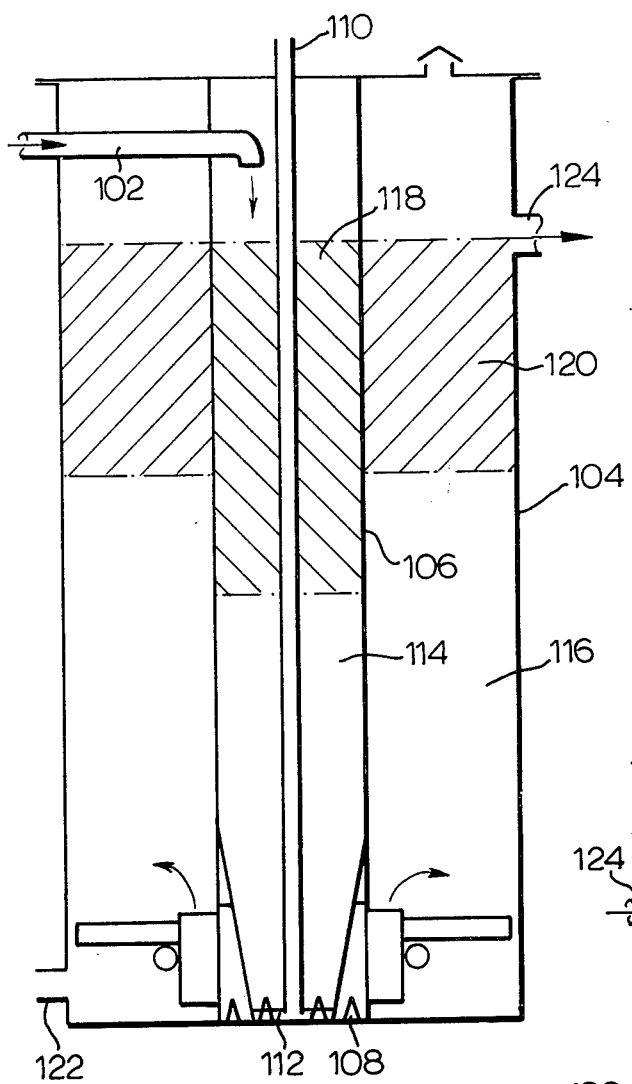
FIG. 4 is a sectional schematic representation of a chemical treatment unit for use in the system of FIG. 1.

As may be seen more particularly from FIG. 3, the phosphate removal unit 68 consists of a cylindrical container 76 in which a conical body member 78 is positioned, defining a first chamber 80 between the conical body member 78 and the interior wall of the container 76, a second chamber 82 within the conical body member 78 and a third chamber 84 located above the conical body member 78.

The processed waste water in line 66 with added chemicals is fed tangentially into the first chamber 80 through outlet pipe 86 of a hydrostatic head box 88 located in the upper portion of container 72. The processed waste water in line 66 also may include occasional loss of biological sludge from the clarifier 60. This loss provides automatic and self-regulating control of the concentration of the microbial population in the adsorption-biooxidation treatment 14.

The first chamber 80, which acts as a reaction chamber for phosphates, contains coagulated suspended solids, i.e. chemical sludge, which are maintained in a rotating fluidized bed. The rotation of the sludge in the first chamber 80 is maintained by the tangential inlet flow throughout outlet pipes 86 at the lower end thereof and further by action of external riser tube 64 communicating with the first chamber 80 through opening 90.

The upflow velocity of the liquid in the first chamber 80 is responsible for fluidization of the coagulated particles in at least the upper portion of the chamber 80. The upflow velocity is proportional to the flow rate of the waste water through oulet pipes 86 and to the cross-sectional area of the first chamber 80.

The chemical reactions between the added chemicals and the impurities occur in the lower portion of the first chamber 80 and the coagulation of the formed flocs occurs in the upper portion of the first chamber 80. The coagulated flocs tend to form a layer of chemical sludge in the upper portion of the first chamber 80 which adsorbs impurities and hence tends to increase the overall removal efficiency of the unit.

The coagulated sludge overflows from the first chamber into the second chamber 82, which acts as a settling chamber for the coagulated sludge. The conical shape of the second chamber 82 causes thickening of the sludge therein. A riser tube 92 extends axially through the unit and terminates immediately above the base of the second chamber 82.

A gas flow tube 94 is positioned internally of the riser tube 92 for feed of air, or other gas, into the riser tube 92 adjacent the lower end thereof, the consequent upward flow of gas in the riser tube 92 causing material to be drawn from the second chamber 82 into and upwardly in the riser tube 92 for discharge of the chemical sludge from the unit 68 through pipe 96, either continuously or intermittently, as desired.

The chemically-treated and clarified waste water flows upwardly from the first chamber 80 to the third chamber 84 for removal from the unit 68 through pipe 98.

Gases formed in the phosphate removal unit 68 may be vented therefrom by vent 99. Sludge accumulations in the first chamber 80 may be removed through pipe 101 as required.

The chemically-treated effluent from the phosphate removal unit 68 in line 98 is fed by an external riser tube 100 into the ozonation unit 70 through pipe 102. The ozonation unit 70 includes an outer cylindrical container 104 and an inner cylindrical tube 106 perforated at its lower end by perforations 108.

An ozone feed tube 110 is located axially of the inner cylindrical tube 106 and terminates at its lower end in a diffuser ring 112 located above the perforations 108.

The inner cylindrical tube 106 and the outer cylindrical container 104 define inner and outer chambers 114 and 116 respectively within the ozonation unit 70. An upper portion of the inner chamber 114 is packed with polyethylene pall rings 118 or similar floating packing material. Similarly, an upper portion of the outer chamber 116 is packed with polyethylene pall rings 120 or similar floating packing material.

The liquid to be treated is fed by line 102 to the top of the inner chamber 114. As the waste water moves downwardly through the inner chamber 114 towards the perforations 108, it is countercurrently contacted with ozone and oxygen fed to the inner chamber 114 through the diffuser 112. The waste water absorbs ozone and oxygen from the rising gas bubbles.

The downward velocity of the waste water through the inner chamber 114, which determines the contact time of the gas bubbles in the inner chamber 114 and hence the proportion of oxygen and ozone absorbed by the liquid, is less than the velocity of upward flow of the gas bubbles but greater than one-third of the velocity of a single bubble rising in stationary liquid.

As the concentration of the ozone in the bubble volume decreases due to the diffusion of ozone into the liquid as the gas rises in the inner chamber 114, a concentration gradient develops in the gas bubbles and the rate of mass transfer decreases.

When the gas bubbles encounter the packing 118, they break down and reform. There results mixing of the gas in the volume of the bubble, disrupting the concentration gradient established in the radial direction of the bubble and increasing the concentration of ozone and oxygen at the bubble surface, and hence increasing the mass transfer rate of the diffusing absorbing gases in the packing 118.

The presence of the floating packing 118 in the first chamber 114 prevents axial mixing of the liquid, thereby creating conditions for a continuous multistage absorption.

The ozone saturated waste water exists from the first chamber 114 through perforations 108 into the lower portion of the second chamber 116. Suspended solids present in the waste water settle out in the second chamber 116 and may be periodically removed from the ozonation unit 70 by line 122.

Oxidation of the contaminants present in the waste water occurs as the water rises in the chamber 116 first through the lower portion and then through the packing 120. A fine precipitate is formed in the oxidation and is trapped in the packing bed 120. The volume of precipitate is very small and hence long continuous operation of the ozonation unit 70 is achieved before backwash of the packing bed 120 is required.

Oxidized waste water is removed from the ozonation unit 70 through pipe 124 located at the top of the second chamber 116. The oxidation of the waste water in the ozonation unit 70 results in an effluent of decreased colour, odor and turbidity, containing chemically oxidized organic and inorganic compounds and is disinfected.

Figure 5:
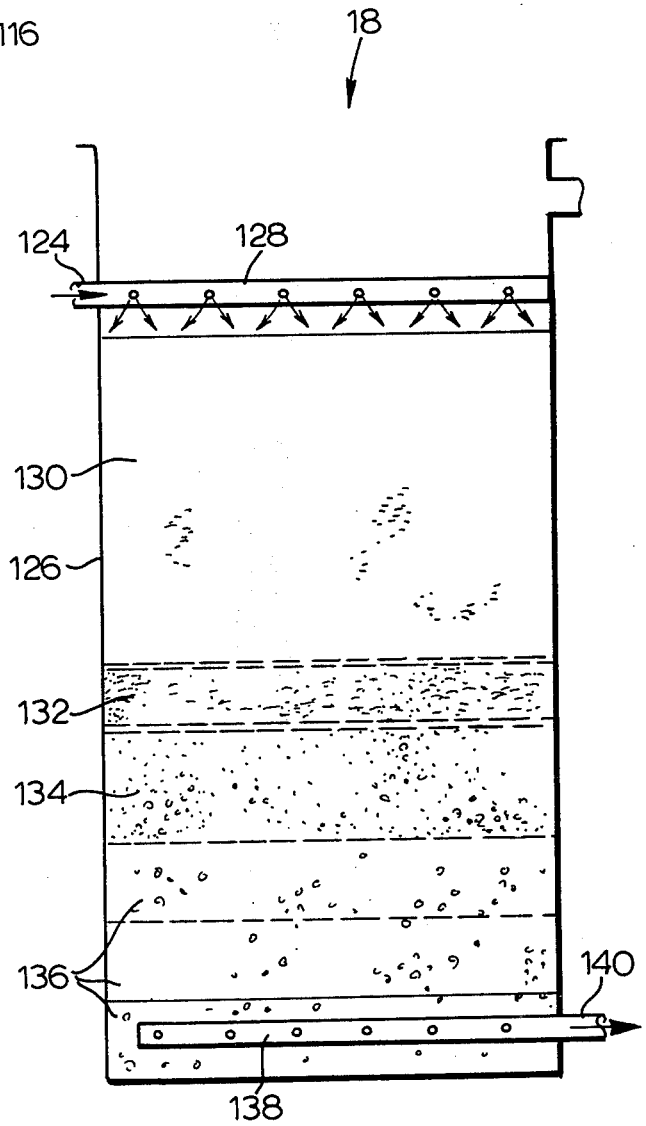
FIG. 5 is a sectional schematic representation of a fixed bed absorption-biooxidation unit for use in the system of FIG. 1.

If further treatment is required, the effluent from the chemical treatment may pass by line 124 to the fixed bed adsorption-biooxidation treatment 18. The adsorption-biooxidation treatment 18 is conducted in a cylindrical vessel 126, shown in detail in FIG. 5, and having a multiple number of beds of different materials therein for percolation of the waste water feed in line 124 therethrough.

The waste water in line 124 is fed into the vessel 126 through a distributor 128 on the upper surface of a bed 130 of granular activated carbon. Suspended solids are removed from the waste water by the granular activated carbon bed 130 by filtration and the dissolved organic matter is removed by adsorption on the activated carbon. The concentration of organic matter on the surfaces of the activated carbon increases to the point where microorganisms can survive and biooxidation can occur.

The concentration of residual organic material in the waste water in line 124 is very low and hence the dissolved oxygen present in the waste water is sufficient for the biooxidation and additional aeration is not required.

Backwashing of the fixed carbon bed 130 is required only very infrequently and hence the microbial population in the media is acclimatised to the type of food present in the waste water. Therefore, the adsorptive capacity of the activated carbon is continuously restored by the microorganisms and thus consistent removal of organic carbon from the waste water on the fixed carbon bed 130 is achieved.

Successive beds of anthracite 132, sand 134 and gravel 136 are provided for consecutive filtration of residual suspended solids from the waste water, the processed water being recovered from the vessel 126 through collector 158 and line 140.

Valved backwash water and air feed lines 142 and 144 respectively may be provided along with a backwash overflow line 146.

Ozone for the ozonation unit 70 is provided by line 148 from any convenient source thereof. The air required for the flash aerators in the primary treatment vessel 22, the adsorption-biooxidation reactor 54 and clarifier 60 and the riser tubes 56, 64, 82 and 100 may be provided by a common air line 150 with suitable valving, as required.

The hydraulically-integrated waste water treatment system 10 therefore provides a four-stage treatment of waste water to remove substantially completely contaminants from the waste water, including suspended solids, organic material, nitrogenous material, phosphates, coliform, turbidity and odor, in which movement of liquids is achieved by utilizing gravity of air riser tubes.

The filtered effluent in line 140 may be treated further, if desired or required, to provide water of potable quality. Such procedures may include one or a combination of evaporation, reverse osmosis, ion-exchange and disinfection. Solid wastes removed from the system in lines 50, 65, 67, 96, 101 and 122 may be disposed of in any desired manner. The quantity of wastes requiring disposal is, however, quite small.

EXAMPLE

An approximately 4000 gallon per day sewage treatment pilot plant operation was set up utilizing the equipment illustrated in FIG. 1 and was operated continuously for a period of 38 days. The contaminants of the sewage in the feed line 20 varied widely over the test period. The operation was unattended except for the taking of samples for analysis.

The hydraulic characteristics of the pilot plant operation over the test period are reproduced in the following Table I:

TABLE I

| Characteristic | Range | Average |
|---|---|---|
| Feed flow rate GPD | 1872 to 4896 | 3168 |
| Hydraulic detention time (Hrs.-based on Q) | | |
| Primary clarifier | 2.9 to 7.7 | 4.5 |
| A-B process - reactor | 4.3 to 11.0 | 6.7 |
| - clarifier | 1.7 to 4.6 | 2.7 |
| Chemical treatment - | | |
| PO$_4$ reactor | 4.8 to 12.8 | 7.4 |
| Ozonation | 2.4 to 6.3 | 3.7 |
| Recycle percent (based on Q) for A-B process | 370 to 490 | 420 |
| Surface overflow rates GPM/sq.ft. (based on Q) | | |
| - primary clarifier | 0.19 to 0.50 | 0.32 |
| - A-B clarifier | 0.17 to 0.34 | 0.23 |
| - PO$_4$ reactor-clarifier | 0.11 to 0.31 | 0.20 |

The water quality of various locations in the pilot plant was determined, namely, the effluent from the primary clarifier, the effluent from the adsorption-biooxidation process, the effluent from the PO$_4$ reactor-clarifier, the effluent from the ozonation unit and the effluent from the multimedia filtration. These water quality results are reproduced in the following Table II:

TABLE II A

| Contaminant | | Raw Sewage Range | Average | Primary Effluent Range | Average | % Total Removed Average | A-B Process Range | Average | % Total Removed Average |
| --- | --- | --- | --- | --- | --- | --- | --- | --- | --- |
| S.S. | mg/l | 63 to 199 | 122 | 16 to 132 | 61 | 50 | 2 to 18 | 9.2 | 92 |
| $BOD_5$ | mg/l | 77 to 217 | 124 | 30 to 202 | 109 | 12 | 5 to 19 | 9.6 | 92 |
| TOC | mg/l | 61 to 124 | 93 | 43 to 142 | 71 | 24 | 6 to 11 | 8 91 | |
| SOC | mg/l | 27 to 53 | 37 | 18 to 55 | 33 | 11 | 5 to 8.5 | 6.4 | 83 |
| $PO_4$ | mg/l | 14 to 29 | 20 | 14 to 28 | 19 | 5 | 10 to 24 | 15 | 25 |
| $NH_3$-N | mg/l | 12 to 35 | 20 | 16 to 28 | 22 | — | <0.4 | <0.4 | >98 |
| TKN | mg/l | 18 to 35 | 28 | 19 to 32 | 27 | 3 | 0.4 to 5.7 | 2.0 | 93 |
| $NO_3$-N | mg/l | 0.2 to 4.3 | 2.5 | 0.2 to 4.4 | 3.3 | — | 3.0 to 8.7 | 6.3 | — |
| TDS | mg/l | 470 to 590 | 503 | 450 to 600 | 495 | — | 450 to 600 | 516 | +2 |
| Turbidity ITU | | 54 to 125 | 75 | 35 to 74 | 49 | 35 | 0.6 to 6.5 | 1.9 | 97 |
| Coliform N/100N | | $\sim 4 \times 10^7$ | — | $\sim 10^7$ | $10^7$ | — | $\sim 10^5$ | $10^5$ | — |

TABLE II B

| Contaminant | | $PO_4$ Treatment Range | Average | Ozone Treatment Range | Average | % Total Removed Average | Filtered Effluent Range | Average | % Total Removed Average |
| --- | --- | --- | --- | --- | --- | --- | --- | --- | --- |
| S.S. | mg/l | 0 to 16.2 | 5.6 | 0 to 11.4 | 5.9 | 95 | 0 to 4 | 1.5 | 99 |
| $BOD_5$ | mg/l | 0.9 to 4.0 | 2.5 | 0 to 4.0 | 2.4 | 98 | 0.4 to 3.0 | 1.8 | 99 |
| TOC | mg/l | 2.5 to 9.5 | 5.1 | 0.5 to 7.0 | 3.9 | 96 | 0.5 to 2.0 | 0.96 | 99 |
| SOC | mg/l | 2.0 to 9.0 | 4.4 | 0.5 to 6.0 | 3.5 | 91 | 0 to 2.0 | 0.7 | 98 |
| $PO_4$ | mg/l | <1.0 | <1.0 | <1.0 | <1.0 | >95 | 1.4 to 2.9 | +1.8 | 91* |
| $NH_3$-N | mg/l | <0.4 | <0.4 | <0.4 | <0.4 | >98 | <0.4 | <0.4 | >98 |
| TKN | mg/l | 0.4 to 1.8 | 0.86 | <0.4 to 1.8 | <0.7 | >98 | <0.4 | <0.4 | >99 |
| $NO_3$-N | mg/l | 2.6 to 9.9 | 5.9 | — | — | — | — | — | — |
| TDS | mg/l | 470 to 603 | 548 | 476 to 621 | 555 | +10 | 440 to 641 | 551 | +10 |
| Turbidity ITU | | 0.5 to 3.9 | 1.6 | 0.6 to 3.0 | 1.2 | 98 | 0.1 to 0.4 | 0.2 | >99 |
| Coliform N/100N | | $\sim 10^4$ | $\sim 10^4$ | 0 to 4 | 1.6 | $\sim 100$ | | | |

*Extraction from filter media.

From the results reproduced in the above Table II, it is possible to calculate the contribution of the individual steps to the overall removal efficiency of the system. The results of this calculation are reproduced in the following Table III:

TABLE III

| Treatment | $BOD_5$ % | TOC % | SOC % | TKN % | Contaminant $NH_3$ % | $NO_3$ mg/l | $PO_4$ % | S.S. % | Turb. % | Coli. % |
| --- | --- | --- | --- | --- | --- | --- | --- | --- | --- | --- |
| Primary | 12 | 24 | 11 | 3 | 0 | +0.8 | 5 | 50 | 35 | — |
| Adsorption-biooxidation | 80 | 67 | 72 | 90 | >98 | +3.0 | 20 | 42 | 62 | — |
| Chemical | 6 | 5 | 8 | 5 | 0 | −0.4 | 70 | 3 | 1 | >99.99 |
| Media Filtration | 1 | 3 | 7 | 1 | 0 | — | −4 | 4 | 1 | — |
| Total | 99 | 99 | 98 | 99 | 98 | — | 91 | 99 | 99 | >99.99 |

The above tabulated results demonstrate the effectiveness of the system of FIG. 1 in removing substantially completely organic, nitrogenous, phosphorus, suspended solid and coliform contaminants from waste water.

The sewage treatment system 10 may be designed to handle a wide range of liquid feed rates while remaining unattended, typically from 5000 to 100,000 gallons per day, and hence provide an effective waste water renovation system for use in apartment blocks, and the like.

SUMMARY

The present invention, therefore, provides a waste water treatment system comprising four hydraulically-interlinked stages which effectively remove a variety of contaminants from waste water, typically domestic sewage.

What is claim is:

1. A process for the renovation of waste water containing a plurality of contaminants including suspended solids, dissolved organic material, nitrogenous material including organic nitrogen-, ammoniacal nitrogenous-, nitrite nitrogen- and nitrate nitrogen-containing materials, phosphate material, odor-imparting material, turbidity-providing materials and bacteria, which comprises:

passing said waste water to a first reaction zone,
removing a part of said suspended solids, dissolved organic materials, nitrogenous material, phosphate material and turbidity-providing materials by subjecting said waste water to a primary treatment in said first reaction zone,
said first reaction zone being constituted by a first single upright tank and said primary treatment comprising:
separating said first tank into a first vertically-extending zone extending the height of the tank and a second vertically-extending zone extending through the tank to a location adjacent to and vertically spaced from the lower end of the tank and in fluid flow communication with said first zone at the lower end of the tank and in fluid flow communication with said first zone at the lower end thereof only,
establishing a liquid level in each of said zones and a flow path of liquid through said first tank downwardly through said first zone and upwardly through said second zone, feeding said waste water to said first zone adjacent the liquid level therein, mixing said fed waste water with a recycled mixture of suspended solids and liquid at said first zone liquid level in such a manner as to form a rotating body of liquid in said first zone to subject said waste water to centrifugal forces to concentrate suspended solids in the liquid in said first zone, accumulating said concentrated suspended solids in the bottom of said first tank, flowing liquor in said flow path from said first zone and into and upwardly through said second zone to separate treated liquid from said accumulated solids for discharge from said primary treatment by withdrawal from said first tank at the downstream end of said flow path treated liquid having a decreased suspended solids- and dissolved organic material-content, anaerobically decomposing at least a portion of said accumulated solids at the bottom of said first tank, removing accumulated solids from the accumulation thereof substantially at the rate of mixing of suspended solids and waste water, and recycling said removed accumulated solids to said first zone as said recycled mixture of suspended solids and liquid, passing the effluent from said primary treatment from said first reaction zone to a second reaction zone, removing from said effluent from said primary treatment phosphate material and substantial quantities of suspended solids, dissolved organic material, nitrogenous material and turbidity-providing materials by subjecting said effluent from said primary treatment to an adsorption-biooxidation treatment utilizing activated carbon and microorganisms in said second reaction zone, removing from said effluent from said adsorption-biooxidation treatment substantial quantities of phosphate material, suspended solids, dissolved organic material, nitrogenous material and turbidity-providing materials and substantially completely said bacteria and odor-imparting material by subjecting said effluent from said adsorption-biooxidation treatment to chemical treatment in said third reaction zone, said chemical treatment being effected in two separate treatment steps, the first chemical treatment step being carried out in a second single upright reaction tank and comprising:

separating said second reaction tank into a first vertically-extending zone extending upwardly from the bottom of the tank for part of the height thereof, a second vertically-extending zone extending upwardly from the bottom of the tank the height of the first zone and in fluid flow communication with said first zone at the upper end only thereof, and a third vertically-extending zone extending upwardly from the upper extremity of the first and second zones in fluid flow communication with said first and second zones, establishing a liquid level in said second tank and a flow path of liquid through said second tank downwardly through said third and first zones respectively out of fluid flow communication therewith and upwardly through said first and third zones respectively, establishing and maintaining a rotating fluidized bed of chemical sludge in said first zone, mixing said effluent from said adsorption-biooxidation treatment with said chemical coagulant, feeding said mixture by gravity along said flow path from the upstream end thereof tangentially into the lower end of said first zone, passing said mixture through said rotating fluidized bed of chemical sludge in said first zone, chemically coagulating said phosphate materials in said fluidized bed, passing treated liquid along said flow path through said third zone, passing chemical sludge from said fluidized bed into said second zone to achieve separation of said treated liquid from chemical sludge, discharging treated liquid having a decreased phosphate-materials content from said third zone at the downstream end of said flow path, and accumulating said passed chemical sludge in said second zone, said second chemical treatment step being carried out in third single upright reaction tank and comprising:

separating said third reaction tank into a first vertically-extending zone extending upwardly from the bottom of the tank extending the height of the tank and a second vertically-extending zone extending the height of the tank in fluid flow communication with said first zone at the lower end thereof only, establishing a liquid level in each of said zones and a flow path of liquid through said third tank downwardly through said first zone and upwardly through said second zone, feeding the effluent from the second tank to said first zone at the liquid level therein, feeding a gaseous mixture of ozone and oxygen into said first zone at the lower end thereof, allowing said gaseous mixture to rise in said first zone countercurrently to said effluent flowing in said flow path, absorbing ozone and oxygen from said gaseous mixture in said effluent in said first zone, passing said effluent having gases absorbed therein from said first zone to said second zone, oxidizing contaminants in said effluent with said absorbed oxygen and ozone in said second reaction zone, filtering solids formed in said second zone from the treated liquid adjacent the downstream end of said flow path, and withdrawing treated liquid having a decreased contaminants content from the downstream end of said flow path, and recovering renovated waste water substantially free from said contaminants from said third reaction zone, fluid flow of waste water from one reaction zone to another and within each reaction zone being achieved solely by a combination of gravitational forces and airlift forces whereby said primary treatment, adsorption-biooxidation treatment and chemical treatment are fluidly interconnected for continuous flow of waste water from one treatment to the next.

2. The process of claim 1 further including passing said renovated waste water to a fixed bed adsorption-biooxidation and filtration treatment for said renovated waste water to remove substantially completely residual contaminants in said renovated water, said fixed bed treatment being fluidly interconnected with said chemical treatment for flow of renovated water continuously from said chemical treatment to the fixed bed treatment.

3. The process of claim 1 wherein said adsorption-biooxidation treatment is carried out in two separate upright tanks with said removal of contaminants occurring in the first of the tanks and separation of entrained activated carbon and microorganisms from the treated liquid occurring in the second tank.

4. The process of claim 1 wherein said first reaction zone is constituted by a liquid-filled first upright reaction tank having a fluid flow path first downwardly of the tank and then upwardly of the tank, said second reaction zone is constituted by second and third liquid-filled upright reaction tanks each having a fluid flow path first downwardly of the tank and then upwardly of the tank, and said third reaction zone is constituted by fourth and fifth liquid-filled upright reaction tanks each having a fluid flow path first downwardly of the tank and then upwardly of the tank.

5. A process for the primary treatment of waste water containing a plurality of contaminants including suspended solids and dissolved organic material in a single upright tank, which comprises:
  separating said tank into a first vertically-extending zone extending the height of the tank and a second vertically-extending zone extending through the tank tank to a location adjacent to and vertically spaced from the lower end of the tank and in fluid flow communication with said first zone at the lower end thereof only,
  establishing a liquid level in each of said zones and a flow path of liquid through said tank downwardly through said first zone and upwardly through said second zone,
  feeding said waste water to said first zone adjacent the liquid level therein,
  mixing said fed waste water with a recycled mixture of suspended solids and liquid at said first zone liquid level in such a manner as to form a rotating body of liquid in said first zone to subject said waste water to centrifugal forces to concentrate suspended solids in the liquid in said first zone,
  accumulating said concentrated suspended solids in the bottom of said tank,
  flowing liquor in said flow path from said first zone into and upwardly through said second zone to separate treated liquid from said accumulated solids for discharge from said primary treatment by withdrawal from said tank at the downstream end of said flow path treated liquid having a decreased suspended solids and dissolved organic material-content,
  anaerobically decomposing at least a portion of said accumulated solids at the bottom of said tank,
  providing conduit means in said tank extending between the bottom of said tank and said first zone through said second zone thereby establishing a second flow path,
  passing a gas into the second flow path adjacent said accumulation,
  drawing solids from said accumulation into said second flow path,
  conveying said drawn solids to said first zone along said second flow path, and
  discharging said conveyed solids into said first zone tangentially of the surface of liquid therein.

6. A process for the chemical treatment of waste water containing at least phosphate materials in a single upright reaction tank, which comprises:
  separating said reaction tank into a first vertically-extending zone extending upwardly from the bottom of the tank for part of the height thereof, a second vertically-extending zone extending upwardly from the bottom of the tank the height of the first zone and in fluid flow communication with said first zone at the upper end only thereof, and a third vertically-extending zone extending upwardly from the upper extremity of the first and second zones in fluid flow communication with said first and second zones,
  establishing a liquid level in said tank and a flow path of liquid through said tank downwardly through said third and first zones respectively out of fluid flow communication therewith and upwardly through said first and third zones respectively,
  establishing and maintaining a rotating fluidized bed of chemical sludge in said first zone,
  mixing said waste water with chemical coagulant,
  feeding said mixture by gravity along said flow path from the upstream end thereof tangentially into the lower end of said first zone,
  passing said mixture through said rotating fluidized bed of chemical sludge in said first zone,
  chemically coagulating said phosphate materials in said fluidized bed,
  passing treated liquid along said flow path through said third zone,
  passing chemical sludge from said fluidized bed into said second zone to achieve separation of said treated liquid from chemical sludge,
  discharging treated liquid having a decreased phosphate-materials content from said third zone at the downstream end of said flow path, and
  accumulating said passed chemical sludge in said second zone.

7. The process of claim 6, wherein said waste water also contains additional contaminants including suspended solids, dissolved organic materials, nitrogenous materials and turbidity-providing materials and including absorbing said at least part of additional contaminants in a layer of chemical sludge in said fluidized bed.

8. The process of claim 7 wherein said first zone has a decreasing cross-sectional size in an upward direction in at least the upper portion thereof and said second zone has a decreasing cross-sectional dimension in a downward direction.

9. The process of claim 6 including withdrawing a portion of said waste water from said first zone to exterior of the reaction tank and recycling said withdrawn portion exteriorally of the reaction tank to the upstream end of said flow path.

10. A process for the ozonation of waste water containing bacterial and odor-imparting contaminants and other contaminants including suspended solids, dissolved organic material, nitrogenous material, phosphate material and turbidity-providing materials in a single upright reaction tank, which comprises:

separating said reaction tank into a first vertically-extending zone extending upwardly from the bottom of the tank through the height of the tank and a second vertically-extending zone extending the height of the tank in fluid flow communication with said first zone at the lower end thereof only, establishing a liquid level in each of said zones and a flow path of liquid through said tank downwardly through said first zone and upwardly through said second zone, feeding said waste water to said first zone at the liquid level therein, feeding a gaseous mixture of ozone and oxygen into said first zone at the lower end thereof, allowing said gaseous mixture to rise in said first zone countercurrently to said waste water flowing in said flow path, absorbing ozone and oxygen from said gaseous mixture in said waste water in said first zone, passing said waste water having gases absorbed therein from said first zone to said second zone, oxidizing contaminants in said waste water with said absorbed oxygen and ozone in said second zone, filtering from the treated liquid in said second zone adjacent the downstream end of said flow path solids formed in said second zone, withdrawing treated liquid having a decreased contaminants content from the downstream end of said flow path.

11. The process of claim 10, including settling solids in said second zone and periodically removing said settled solids.

* * * * *